Aug. 5, 1924.
C. W. DAVIS
CRANK CASE OIL TESTER
Filed July 5, 1923
1,503,749
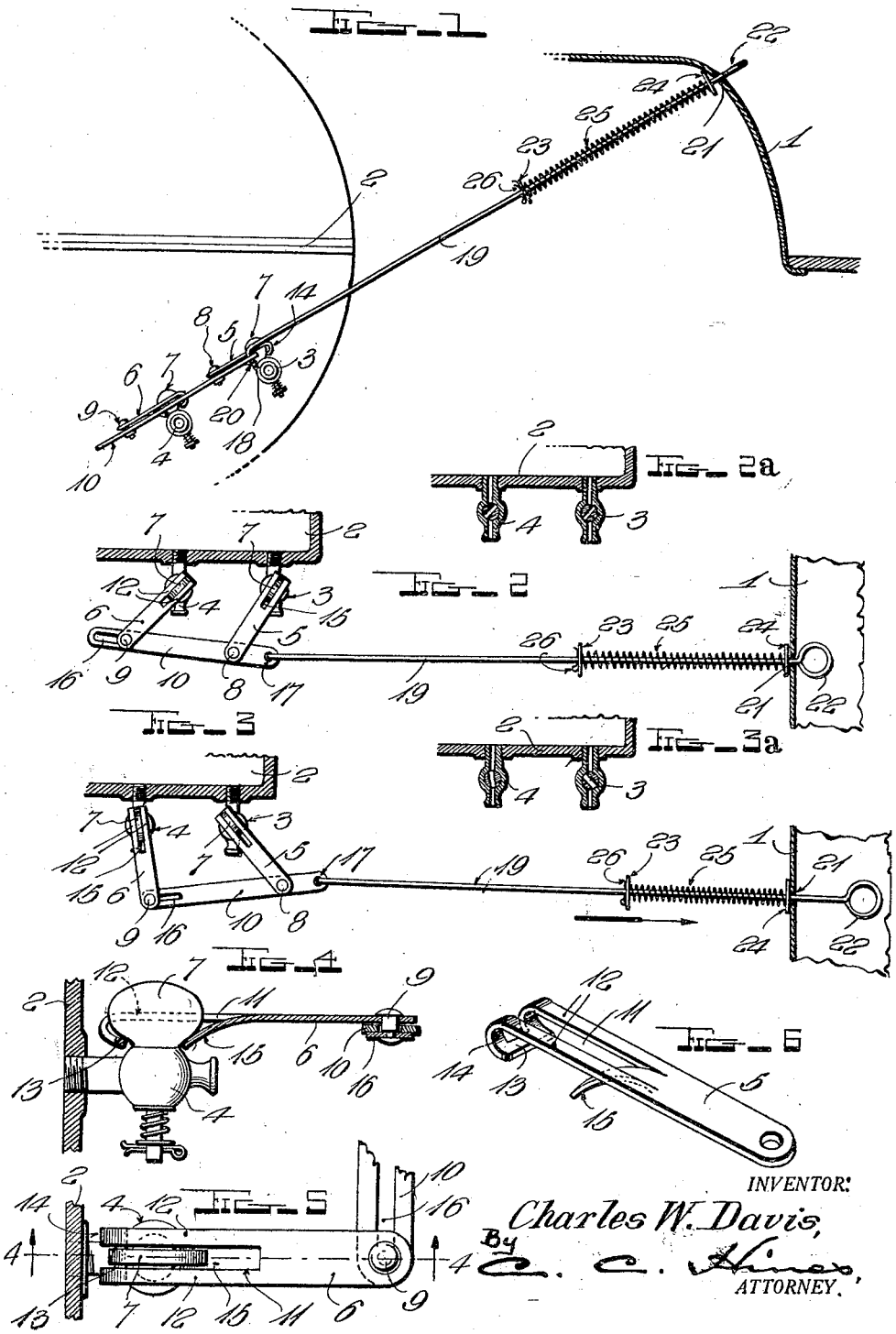
INVENTOR:
Charles W. Davis,
By C. C. Hines
ATTORNEY.

Patented Aug. 5, 1924.

1,503,749

UNITED STATES PATENT OFFICE.

CHARLES W. DAVIS, OF McALESTER, OKLAHOMA.

CRANK-CASE-OIL TESTER.

Application filed July 5, 1923. Serial No. 649,524.

*To all whom it may concern:*

Be it known that I, CHARLES W. DAVIS, a citizen of the United States, residing at McAlester, in the county of Pittsburg and State of Oklahoma, have invented new and useful Improvements in Crank-Case-Oil Testers of which the following is a specification.

This invention relates to crank-case oil testers, and particularly to means for opening and closing the test cocks of the crank cases of automobiles whereby the amount of lubricating oil contained therein may be determined.

One object of the invention is to provide means whereby the test cocks may be easily and conveniently opened and closed for testing operations without the necessity of the operator getting under his car.

Another object of the invention is to provide a testing device which will permit of the removal of the motor for repairs or other purposes without the necessity of detaching from the crank-case the parts of the testing device connected therewith.

Still another object of the invention is to provide a tester the parts of which are so arranged as to be protected from injury by contact with extraneous objects in the travel of the vehicle over rough roads and through weeds, brush, etc.

Still another object of the invention is to provide a tester by means of which the oil cocks may be opened one after the other and both closed at the same time, whereby certain advantages in the way of preventing loss of oil, etc., are obtained.

Still another object of the invention is to provide novel means for coupling the cock actuating members of the device to the oil cocks, whereby the use of bolts or other auxiliary fastenings is avoided.

Still another object of the invention is to provide an oil tester which is simple of construction, inexpensive of production and installation, and reliable and efficient in use.

With these and other objects in view, the invention consists of the features of construction, combination and arrangement of parts, hereinafter fully described and claimed, reference being had to the accompanying drawing, in which:—

Figure 1 is a sectional side elevation of part of an automobile structure, showing the application of the invention.

Figure 2 is a sectional plan view of parts shown in Figure 1, with the test cocks arranged in normally closed position.

Figure 2ª is a sectional view through the crank-case and cocks, showing the cocks as arranged in Figure 2.

Figure 3 is a view similar to Figure 2 showing the operating rod at the limit of its operating movement, in which the upper pet cock is closed and the lower pet cock opened.

Figure 3ª is a view similar to view 2ª showing the cocks as arranged under the movement of the parts indicated in Figure 3.

Figure 4 is a sectional view on the line 4—4 of Figure 5.

Figure 5 is a plan view of one of the test cocks and one of the crank arms.

Figure 6 is a perspective view of one of the crank arms.

Referring now more particularly to the drawings, 1 designates a splash board or shield forming part of an automobile structure and 2 the oil containing motor crank-case, said crank-case being provided with the oil test cocks 3 and 4 arranged, as usual, at different levels.

In accordance with my invention, I provide means for opening and closing the test cocks 3 and 4 in a prescribed manner and without the necessity of the operator getting down off the automobile and under the same, as is usually required. The operating means for this purpose comprises crank arms 5 and 6 of similar construction connected to the finger pieces 7 of the respective cocks 3 and 4. These crank arms are provided at their inner ends with novel means for connection with the finger pieces 7 and at their outer ends are pivotally connected respectively by headed pins or rivets 8 and 9 with a connecting rod or plate 10.

As shown, each crank arm 5 or 6 is longitudinally slotted, as at 11, at its cock engaging end to receive the finger piece 7 of the cock, such slot 11 providing spaced arms at opposite sides thereof to bear against the opposite sides of the finger piece 7, so as to ensure positive turning of the cock plug when the crank arm is moved in one direction or the other. The slot 11 terminates short of a complete separation of the arms 12 at their extremities, providing a cross-piece 13, and this cross-piece, and the adjacent portions of the arms 12, are bent downwardly and under the arms to provide a hook-shaped clamping jaw 14. The portion of the metal displaced to form the slot 11 is left intact at its inner end with the body of the crank arm and bent or curved downwardly at its free end to provide a clamping jaw 15. Normally the jaws 14 and 15 are spaced a sufficient distance apart to permit the slotted end of the crank arm to be fitted over the finger piece 7 of the cock and the jaws 14 and 15 to be brought in engagement with the lower, undercut portion of the finger piece 7 below its horizontal center. By then simply bending up the jaw 15, and bending the jaw 14, if desired, to a desired extent, by means of a pair of pliers or other similar tool, the jaws may be brought closer together so as to engage opposite sides of the undercut portion of the finger piece. By this means the crank arm may be coupled to the finger piece or handle of the cock, in a simple, ready and expeditious manner, and against any liability of casual displacement, without the necessity of using bolts or other fastenings which are liable to work loose.

The pin or rivet 8 which couples the crank arm 5 of the upper test cock 3 to the connecting rod 10 forms a fixed pivotal connection between said crank arm and connecting rod, so that on each forward and backward movement of the connecting rod the cock 3 will be positively opened or closed. The pin 9, however, which connects the crank arm 6 of the lower test cock 4 with the connection rod 10 is fitted to slide in a longitudinal slot 16 formed in the connecting rod, whereby a slip-joint or lost-motion connection is provided between the crank arm 6 and the rod 10 to adapt the cock 3 to be opened and closed, if desired, without opening the cock 4, or to permit the cock 3 to be opened before the cock 4 is opened, and to adapt both cocks when opened to be simultaneously closed.

The outer end of the connecting rod is formed with an opening 17 to receive the bent forward end 18 of an operating rod 19. The said end 18 of the rod 19 is pierced to receive a cotter pin or like fastening 20, which holds it from displacement and at the same time permits of its convenient release for disconnection from the connecting rod 10 whenever desired. The rod 19 extends outwardly toward the side of the automobile and slidably passes through an opening 21 in the splash board or shield 1 and is provided at such rear end with a finger piece or ring 22. Disposed upon the rod are abutments 23 and 24, between which is arranged a coiled spring 25 which encircles the rod. These abutments may be in the form of washers, and the abutment 23 is held from sliding movement on the rod by a cotter pin or like fastening 26 passing through the rod, while the abutment 24 is loosely mounted on the rod and bears against the splash board or shield 1. This construction adapts the rod 19 to be drawn or pulled outwardly against the resistance of the spring 25, which is thereby compressed, in which operation motion in an opening direction will be communicated to the valves through the connecting rod 10 and crank arms 5 and 6, the release of the finger piece 22 causing the spring 25 by reaction to move the rod 19 forwardly and thus shift the connecting rod and crank arms in the reverse direction for an automatic cock closing action. The detachable connection between the connecting rod 10 and operating rod 19 adapts the operating rod to be released from the connecting rod whenever it is desired to remove the motor or crank-casing for repairs or other purposes, without the necessity of disconnecting the connecting rod 10 and the crank arms 5 and 6. By extending the operating rod 19 at an upward and outward angle and through the splash board or shield 1 it is disposed at a comparatively high level so that it will be protected by the parts of the vehicle against injury or movement by contact with brush, weeds, and other extraneous objects in the travel of the vehicle over rough places and through undergrowth.

The described arrangement of the operating rod 19 also adapts the test cocks to be operated without the necessity of the operator getting under the machine. As described, an outward pull upon the rod 19 will result in a cock opening movement being transmitted to the cock opening mechanism, and this degree of movement may be regulated as desired, so that the cock 3 may be opened without opening the cock 4 or so that the cocks may be successively opened, one after the other, for testing purposes. When the rod 19 is pulled outwardly to a certain degree, so as to have what may be called a preliminary traverse, the crank arm 5 will be positively operated to open the cock 3, but in such movement the pivot 9 of the crank arm 6 will simply slide in the slot 16, so that the cock 4 will remain closed or unaffected. As a result of this movement, the operator may open the cock 3, without opening the cock 4, so as to determine whether or not the crank-case is filled with oil to the highest level, which will be determined by escape of oil through the cock 3. If no oil escaped through the cock 3, the operator will know that the oil has fallen below the level of such cock, and by giving a further outward or final preliminary traverse to the rod 19 may transmit movement to the crank arm 6 to open the cock 4 by engagement of the outer end wall of the slot 14 with the pivotal connection 9. The escape or non-escape of oil through the cock 4 will thereupon show whether the crank-case is filled with oil to the lowest working level or whether the oil has fallen below such level and replenishment of the crank-case with oil is necessary. Upon the release of the finger piece 22, however, the rod 19 will be moved under the action of the spring 25 so as to shift the connecting rod 10 to the fullest extent inwardly, thus simultaneously closing both cocks 3 and 4 in a single operation.

From the foregoing description, taken in connection with the drawings, the construction and mode of operation of the device will be readily understood, and it will be seen that the invention provides an oil discharge which is simple of construction, adapted to be easily applied and which may be operated in a ready and convenient manner. By the construction described, which adapts the upper oil cock to be opened without opening the lower oil cock, the necessity of opening the latter if the oil is at the higher level is avoided, and waste of oil through the lower oil cock prevented. In the event, however, that the upper oil cock is alone opened, or if both oil cocks are successively opened, it will be seen that the mechanism will be positive in operation in closing the open cock or cocks upon the release of the handle 22 of the operating rod 19, and that at all times in the running of the vehicle the pressure of the spring 25 will hold the cocks closed against any liability of casual opening movement. The construction of the crank arms which adapts them to be applied to the cocks without the use of bolts or other fastenings ensures ease of connection, as by means of a wrench or other available tool whose gripping jaws may be easily adjusted to engage the cock handle, and such connection provides a positive engagement and obviates the use of bolts or other fastenings liable to work loose or become disconnected. These and other advantages of the invention will be readily understood by those versed in the art without a further and extended description.

Having thus fully described my invention, I claim:—

1. The combination with a receptacle having test cocks arranged at different working levels, each of said cocks being provided with a manipulating handle, of crank members for connection with the handles of the cocks, each comprising a sheet metal arm slotted for passage of the cock handle therethrough transversely of the arm, portions of said arm at opposite ends of said slot being bent beyond one side of the arm and providing jaws for engagement with the cock handle for coupling the crank arm thereto, and means connected with the crank arms for transmitting motion thereto.

2. In a device of the character described, a cock actuating crank having a slot to receive the crank handle, a jaw conjointly formed by portions of the walls of the slot to engage one side of the cock handle, and a jaw formed by a portion of the metal displaced in forming the slot bendable for engagement with an opposite side of the crank handle.

In testimony whereof I affix my signature.

CHARLES W. DAVIS.